J. D. JONES.
SELF OILING BUSHING.
APPLICATION FILED JAN. 8, 1917.

1,230,823.

Patented June 19, 1917.

Witness

Inventor
John D. Jones
By David P. Moore,
Attorney

UNITED STATES PATENT OFFICE.

JOHN D. JONES, OF WALLA WALLA, WASHINGTON.

SELF-OILING BUSHING.

1,230,823.

Specification of Letters Patent. Patented June 19, 1917.

Application filed January 8, 1917. Serial No. 141,340.

*To all whom it may concern:*

Be it known that I, JOHN D. JONES, a citizen of the United States, residing at Walla Walla, in the county of Walla Walla and State of Washington, have invented certain new and useful Improvements in Self-Oiling Bushings, of which the following is a specification, reference being had therein to the accompanying drawing.

This invention relates to improvements in self oiling bushings, one object of the invention being the provision of a practically dust proof bushing, carrying means whereby lubricant may be supplied to the axle or shaft upon which the same is mounted and also being so constructed as to be readily placed within the member carried thereby, as for instance, a pulley or wheel hub, as the case may be.

A further object of this invention is the provision of a bushing of this character which is provided with an absorbent carrying portion adjacent each end thereof which is in communication with an annular space so that the shaft upon which the bushing is mounted will be contacted by the absorbent so that not only the lubricant will be properly supplied thereto but dust will be excluded, a lubricant being supplied at one place directly to the shaft while adjacent the opposite ends thereof through the absorbent material.

A still further object of this invention is the provision of a bushing of this type which is readily placed in the carrying sleeve of a pulley or hub, thus rendering it possible to assemble the same in an easy and quick manner whereas the same when not worn out may be readily removed from a worn out pulley or hub box and placed in a new one.

Figure 1:
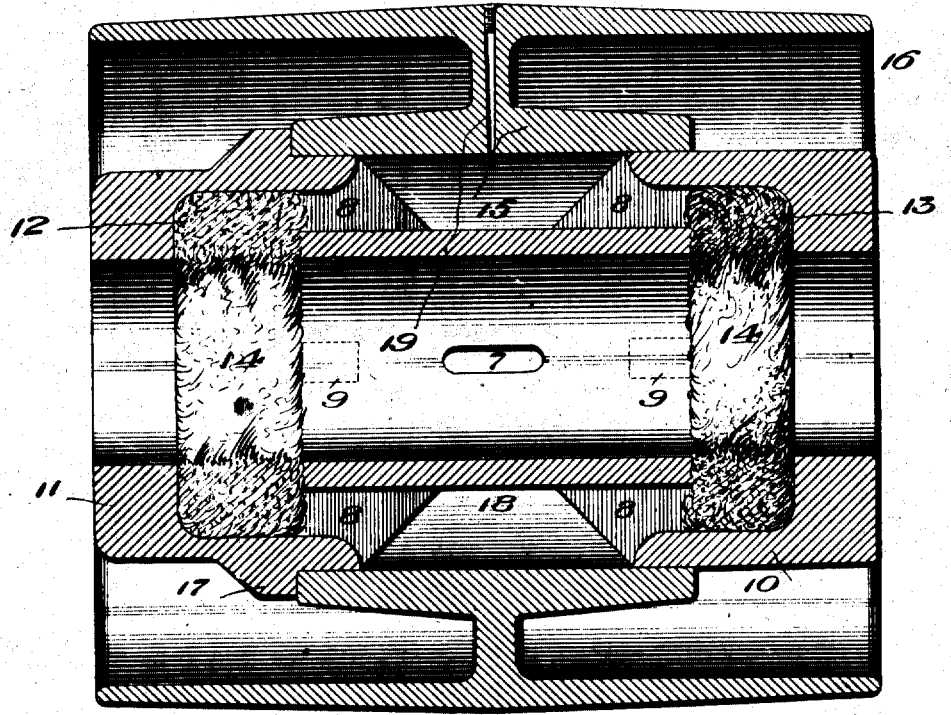
Figure 1 is a longitudinal sectional view through the bushing as applied to a pulley.
Figure 2:
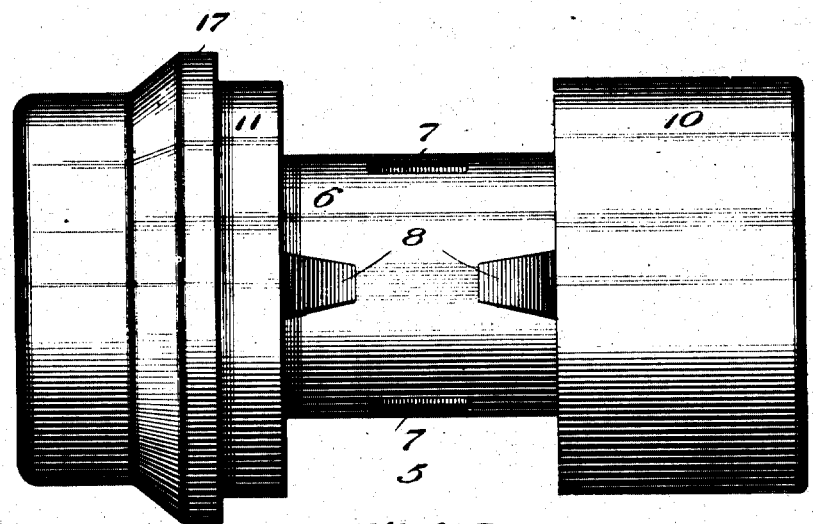
Fig. 2 is a view in elevation of the bushing *per se.*

Referring to the drawings, the numeral 5 designates the bushing which is here shown made of a single casting and comprises the connecting or shaft surrounding sleeve 6 having the lubricant conducting slot 7 therethrough with two pair of diametrically disposed integral lugs 8 at the opposite ends thereof which with the smaller integral lugs 9 connect the tubular end 10 and the shouldered plural diametered end 11 thereto. Formed within the respective ends 10 and 11 are the annular chambers 12 and 13 for the reception of the lubricant absorbent material 14 which is preferably any form of loose material, such as cotton or woolen waste.

It will thus be seen that the lugs 8 and 9 provide passage ways from the exterior of the sleeve 6 to the respective chambers 12 and 13 so that when the bushing is assembled, as shown in Fig. 1, the sleeve 15 of the pulley 16 surrounds the respective inner ends of the members 10 and 11 with the shoulder 17 against one end of the sleeve 15, and an annular lubricant receiving chamber 18 is provided which supplies the lubricant through the slot 7 to the shaft, not shown, and between the lugs 8 and 9 to the absorbent material 14.

It will be noted that the sleeve portion 10 is so constructed as to permit the bushing to be driven from the left to the right as shown in Fig. 1 to be wedged tightly within the sleeve 15 so that the pulley will not rotate independently of the bushing, it being a tight driven fit.

From the foregoing description it is evident that when the bushing is worn it is merely necessary to drive the bushing 5 from right to left out of the sleeve 15 so that a new bushing can be inserted or when it is desired to fill the cavity 18 with the lubricant this can be resorted to.

The sleeve 15, although shown here as a portion of the pulley 16 may be indicative of any hub or box to receive the bushing 5 as the present bushing can be applied to any form of straight journal bearing or even in connection with a wheel hub.

A duct or bore 19 extends from the periphery of the pulley 16 into the oil chamber 18 so that the oil chamber may be filled through such bore that is closed by a screw at the outer end.

What I claim as new is:

1. A bearing bushing for pulleys and the like, comprising end sleeves spaced apart, an intermediate sleeve extending thereinto and a plurality of lugs connecting the ends of said intermediate sleeve with the end sleeves, said sleeves having axially alined shaft openings.

2. A bearing bushing for pulleys and the like, comprising end sleeves spaced apart, an intermediate sleeve extending thereinto, and a plurality of lugs connecting the ends of said intermediate sleeve with the end sleeves, said sleeves having axially alined shaft openings, and said end sleeves having annular recesses in their inner walls located at the ends of said intermediate sleeve.

3. A bearing bushing for pulleys and the like, comprising separated end sleeves, each having an annular recess in its inner wall forming a lubricant packing chamber, an intermediate sleeve having its ends terminating in said recesses, and lugs or webs connecting the ends of said intermediate sleeve with the end sleeves and in spaced relation thereto.

4. The combination with a carrying sleeve, of a bushing including a sleeve of lesser diameter than the carrying sleeve, a plurality of external radial lugs formed adjacent the ends thereof, two sleeves of greater diameter than the second sleeve and connected thereto by such lugs, and extending over the ends thereof, one of said sleeves being of such a diameter as to slip through the carrying sleeve, the space between the smaller sleeve of the bushing and the carrying sleeve constituting a lubricant receiving chamber.

5. The combination with a carrying sleeve, of a bushing including a sleeve of lesser diameter than the carrying sleeve, a plurality of external radial lugs formed adjacent the ends thereof, two sleeves of greater diameter than the second sleeve and connected thereto by such lugs, one of said last mentioned sleeves being of such a diameter as to slip through the carrying sleeve while the other of the two larger sleeves is provided with an annular shoulder to abut one end of the carrying sleeve to limit the position of the bushing relative to the carrying sleeve, there being provided between the smaller sleeve of the bushing and the carrying sleeve a surrounding lubricant receiving compartment.

6. The combination with a carrying sleeve, of a bushing including a sleeve of lesser diameter than the carrying sleeve, a plurality of external radial lugs formed adjacent the ends thereof, two sleeves of greater diameter than the second sleeve and connected thereto by such lugs, one of last mentioned sleeves being of such a diameter as to slip through the carrying sleeve while the other of the two larger sleeves is provided with an annular shoulder to abut one end of the carrying sleeve to limit the position of the bushing relative to the carrying sleeve, there being provided between the smaller sleeve of the bushing and the carrying sleeve a surrounding lubricant receiving compartment, each of said larger sleeves being provided with an absorbent material receiving compartment adjacent each end of the smaller sleeve, each of the latter compartments being of greater diameter than the external diameter of the said second sleeve and being in communication with the lubricant receiving compartment.

In testimony whereof I affix my signature in presence of two witnesses.

JOHN D. JONES.

Witnesses:
F. G. B. GREEN,
JOHN H. LAMBIE.